United States Patent
Thordsen et al.

(10) Patent No.: US 10,339,540 B2
(45) Date of Patent: Jul. 2, 2019

(54) METHODS AND SYSTEMS FOR COORDINATED COUPON DELIVERY

(75) Inventors: James A. Thordsen, Pleasanton, CA (US); Raza Ali Malik, San Jose, CA (US); Scott Bruck, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 876 days.

(21) Appl. No.: 12/610,069

(22) Filed: Oct. 30, 2009

(65) Prior Publication Data

US 2011/0106606 A1 May 5, 2011

(51) Int. Cl.
*G06Q 30/02* (2012.01)

(52) U.S. Cl.
CPC ......... *G06Q 30/02* (2013.01); *G06Q 30/0222* (2013.01); *G06Q 30/0224* (2013.01); *G06Q 30/0236* (2013.01); *G06Q 30/0239* (2013.01)

(58) Field of Classification Search
None
See application file for complete search history.

(56) References Cited

U.S. PATENT DOCUMENTS

| | | | |
|---|---|---|---|
| 5,832,457 A | 11/1998 | O'Brien et al. | |
| 6,298,329 B1 | 10/2001 | Walker et al. | |
| 6,766,301 B1 * | 7/2004 | Daniel et al. | 705/14.26 |
| 6,915,271 B1 * | 7/2005 | Meyer | G06Q 30/02 705/14.35 |
| 7,107,226 B1 | 9/2006 | Cassidy et al. | |
| 7,980,466 B2 | 7/2011 | Lee et al. | |
| 8,459,551 B2 | 6/2013 | Lee et al. | |
| 2001/0037206 A1 | 11/2001 | Falk et al. | |
| 2002/0188503 A1 | 12/2002 | Banerjee et al. | |
| 2003/0069737 A1 | 4/2003 | Koubenski et al. | |
| 2003/0154125 A1 * | 8/2003 | Mittal | G06Q 30/02 705/14.23 |
| 2003/0212595 A1 | 11/2003 | Antonucci | |
| 2004/0019494 A1 | 1/2004 | Ridgeway et al. | |
| 2004/0138953 A1 | 7/2004 | Van Luchene et al. | |
| 2004/0177009 A1 | 9/2004 | Schrenk | |
| 2005/0114229 A1 | 5/2005 | Ackley et al. | |
| 2005/0144066 A1 | 6/2005 | Cope et al. | |
| 2005/0144074 A1 * | 6/2005 | Fredregill et al. | 705/14 |
| 2005/0234771 A1 * | 10/2005 | Register | G06Q 30/02 705/14.25 |

(Continued)

OTHER PUBLICATIONS

An Architecture for Mobile Payments and Couponing in the Retail Industry, Ondrus et al., 17th Bled eCommerce Conference eGlobal, Bled, Slovenia, Jun. 21-23, 2004.*

(Continued)

*Primary Examiner* — David J Stoltenberg
(74) *Attorney, Agent, or Firm* — Maschoff Brennan

(57) ABSTRACT

Methods and systems for coordinating delivery of coupons issued by a network-based system are disclosed. For example, a system can include a coupon generation engine, a coupon widget, and a communications module. The coupon generation engine can issue a unique coupon redeemable exclusively by a registered user of the network-based system. The coupon widget can present the unique coupon via a first communication channel internal to the network-based system. The communications module can deliver the unique coupon to the registered user via a second communication channel external to the network-based system.

21 Claims, 11 Drawing Sheets

(56) References Cited

U.S. PATENT DOCUMENTS

| | | | |
|---|---|---|---|
| 2006/0080321 A1* | 4/2006 | Horn ................ G06F 17/30867 |
| 2006/0149681 A1 | 7/2006 | Meisner | |
| 2006/0178918 A1 | 8/2006 | Mikurak | |
| 2006/0265281 A1* | 11/2006 | Sprovieri et al. ............... 705/14 |
| 2007/0150339 A1* | 6/2007 | Retter et al. ..................... 705/14 |
| 2007/0174259 A1* | 7/2007 | Amjadi ............................. 707/3 |
| 2007/0198355 A1 | 8/2007 | Samson et al. | |
| 2007/0203791 A1 | 8/2007 | Kohl et al. | |
| 2007/0214057 A1 | 9/2007 | Lee et al. | |
| 2007/0266130 A1 | 11/2007 | Mazur et al. | |
| 2007/0276730 A1 | 11/2007 | Lee | |
| 2008/0065490 A1* | 3/2008 | Novick ................. G06Q 30/02 705/14.26 |
| 2008/0077484 A1* | 3/2008 | Main et al. ..................... 705/14 |
| 2008/0215438 A1* | 9/2008 | Muthugopalakrishnan et al. ....... 705/14 |
| 2008/0221997 A1* | 9/2008 | Wolfe ............................ 705/14 |
| 2008/0262928 A1* | 10/2008 | Michaelis ....................... 705/14 |
| 2008/0306790 A1* | 12/2008 | Otto ..................... G06Q 10/087 705/7.34 |
| 2008/0319846 A1 | 12/2008 | Leming et al. | |
| 2009/0061884 A1 | 3/2009 | Rajan et al. | |
| 2009/0119161 A1* | 5/2009 | Woda et al. .................... 705/10 |
| 2009/0144201 A1 | 6/2009 | Gierkink et al. | |
| 2009/0254930 A1 | 10/2009 | Lo et al. | |
| 2009/0288012 A1* | 11/2009 | Hertel .................... G06Q 20/02 715/738 |
| 2010/0153205 A1* | 6/2010 | Retter et al. ............... 705/14.26 |
| 2010/0179877 A1* | 7/2010 | Lam ....................... G06O 30/00 705/14.55 |
| 2010/0274625 A1* | 10/2010 | Carlson ............... G06Q 20/202 705/14.3 |
| 2011/0106600 A1* | 5/2011 | Malik .................... G06Q 30/02 705/14.13 |
| 2011/0106605 A1 | 5/2011 | Malik et al. | |
| 2011/0137718 A1* | 6/2011 | Scroggie ............... G06Q 20/12 705/14.23 |
| 2011/0137730 A1* | 6/2011 | McCarney ....... G06Q 10/06311 705/14.58 |
| 2011/0258027 A1 | 10/2011 | Lee et al. | |
| 2013/0246196 A1 | 9/2013 | Lee et al. | |

OTHER PUBLICATIONS

Towards an understanding of the consumer acceptance of mobile wallet, Dong-Hee Shin, Computers in Human Behavior 25 (2009) 1343-1354.*

"U.S. Appl. No. 11/643,577, Final Office Action dated Jan. 14, 2011", 16 pgs.

"U.S. Appl. No. 11/643,577, Final Office Action dated Mar. 3, 2010", 12.

"U.S. Appl. No. 11/643,577, Non-Final Office Action dated Jul. 9, 2009", 11 Pgs.

"U.S. Appl. No. 11/643,577, Non-Final Office Action dated Aug. 4, 2010", 15 pgs.

"U.S. Appl. No. 11/643,577, Non-Final Office Action dated Dec. 31, 2008", 16 pgs.

"U.S. Appl. No. 11/643,577, Notice of Allowance dated Jun. 10, 2011", 8 pgs.

"U.S. Appl. No. 11/643,577, Response filed Apr. 7, 2011 to Final Office Action dated Jan. 14, 2011", 15 pgs.

"U.S. Appl. No. 11/643,577, Response filed Jun. 3, 2010 to Final Office Action dated Mar. 3, 2010", 13 pgs.

"U.S. Appl. No. 11/643,577, Response filed Oct. 9, 2009 to Non Final Office Action dated Jul. 9, 2009", 13 pgs.

"U.S. Appl. No. 11/643,577, Response filed Nov. 4, 2010 to Non Final Office Action dated Aug. 4, 2010", 13 pgs.

"U.S. Appl. No. 11/643,577, Response filed Mar. 31, 2009 to Non Final Office Action dated Dec. 31, 2008", 13 pgs.

"U.S. Appl. No. 12/610,057, Non Final Office Action dated Aug. 2, 2012", 17 pgs.

"U.S. Appl. No. 12/610,078, Non Final Office Action dated Aug. 17, 2012", 14 pgs.

"U.S. Appl. No. 13/171,057, Non Final Office Action dated Mar. 7, 2012", 14 pgs.

"U.S. Appl. No. 13/171,057, Notice of Allowance dated Oct. 11, 2012", 8 pgs.

"U.S. Appl. No. 13/171,057, Response filed Jun. 7, 2012 to Non Final Office Action dated Mar. 7, 2012", 10 pgs.

"U.S. Appl. No. 12/610,057, Response filed Dec. 31, 2012 to Non Final Office Action dated Aug. 2, 2012", 15 pgs.

"U.S. Appl. No. 12/610,078, Response filed Dec. 17, 2012 to Non Final Office Action dated Aug. 17, 2012", 13 pgs.

"U.S. Appl. No. 12/610,057, Final Office Action dated Apr. 29, 2013", 28 pgs.

"U.S. Appl. No. 12/610,078, Final Office Action dated Apr. 5, 2013", 27 pgs.

"U.S. Appl. No. 13/171,057, PTO Response to Rule 312 Communication dated May 17, 2013", 2 pgs.

"U.S. Appl. No. 12/610,057, Examiners Answer dated Jan. 28, 2014", 31 pgs.

"U.S. Appl. No. 12/610,078, Decision on Pre-Appeal Brief Request dated Sep. 16, 2013", 2 pgs.

"U.S. Appl. No. 12/610,078, Response filed Jan. 30, 2014 to Non Final Office Action dated Oct. 30, 2013", 11 pgs.

"U.S. Appl. No. 13/871,408, Response filed Jan. 27, 2014 to Non Final Office Action dated Sep. 26, 2013", 9 pgs.

"U.S. Appl. No. 12/610,057, Appeal Brief filed Sep. 30, 2013", 19 pgs.

"U.S. Appl. No. 12/610,078, Non Final Office Action dated Oct. 30, 2013", 43 pgs.

"U.S. Appl. No. 12/610,078, Pre-Appeal Brief Request for Review filed Aug. 5, 2013", 5 pgs.

"U.S. Appl. No. 13/871,408, Non Final Office Action dated Sep. 26, 2013", 7 pgs.

U.S. Appl. No. 13/871,408, filed Apr. 26, 2013, System and Method to Promote a Publication.

* cited by examiner

424

| Marketplace  — 426 |
|---|

Checkout  — 902

① Review Your Purchase ▶ ② Confirm Your Payment ▶ ③ Choose Payment Method

Shipping address

Joe User
1235 N. Main St.  — 904
Big Town, CA 95125
United States

Order details  — 906

Seller: ukmary

| Nikon D80 | Qty. 1 | Price: $389.95 |
| Nikon 15-85mm Lens | Qty. 1 | Price: $59.95 |

Sub Total: $449.90
Coupon Discount: -$134.97  — 908

Enter a Coupon Code: | $$$ Redeem a Coupon  — 910

[Enter Text] [Apply]
  ⦿ $134.97 (30%) off entire purchase – exp. 3/15/2009
  ○ $20.00 Off a single item – exp. 3/15/2009  — 912
  ○ $38.99 (10%) off a single item – exp. 3/15/2009
  ○ No Thanks, save coupons for a future purchase
918

914 — Select another coupon ⌄

$5.00 off on one single item exp. 6/1/09
$44.90 (10%) off entire purchase – exp. 8/1/09
$25 off any camera accessory – exp. 6/1/09

| Subtotal: | $449.90 |
| 30% off entire purchase | -$134.97 |  — 916
| Shipping & Handling | $25.00 |

Total:     $339.93

*FIG. 9*

METHODS AND SYSTEMS FOR COORDINATED COUPON DELIVERY

TECHNICAL FIELD

This application relates generally to transactions over a distributed network, and more specifically to methods and systems for coordinated coupon delivery by a networked system.

BACKGROUND

Traditional paper coupons delivered through the mail or in the newspaper have been used by organizations for years to incent desired customer behaviors. The basic delivery mechanisms for traditional coupons have changed little over the years even as new technologies have altered the way the typical consumer receives purchase information and makes purchase decisions.

The advent of the Internet has driven the development of new methods of delivering information to consumers and provided marketers additional avenues for delivering promotional information, such as electronic mail. The ease and relatively low cost of sending out electronic promotional information has led to a dramatic increase in the amount of promotional information received by the average consumer. Interestingly, most promotional information remains completely anonymous, untargeted, and generally ignored by the recipient. Some efforts at personalization and targeted marketing has been developed through mechanisms such as opt-in electronic mail programs.

As part of the electronic marketing revolution driven primarily by the ease of communication over the Internet, coupon delivery has also moved online. However, other than the mechanism of delivery, coupons have changed little in the transition to electronic delivery. Coupons remain anonymous promotions targeted at large groups of consumers. Even coupons delivered through some sort of opt-in electronic marketing campaign will be redeemable by anyone that receives the offer.

BRIEF DESCRIPTION OF THE DRAWINGS

Some embodiments are illustrated by way of example and not limitation in the figures of the accompanying drawings in which:

FIG. 9 is a block diagram illustrating an example checkout page demonstrating example coupon display capabilities.

DETAILED DESCRIPTION

Figure 1:
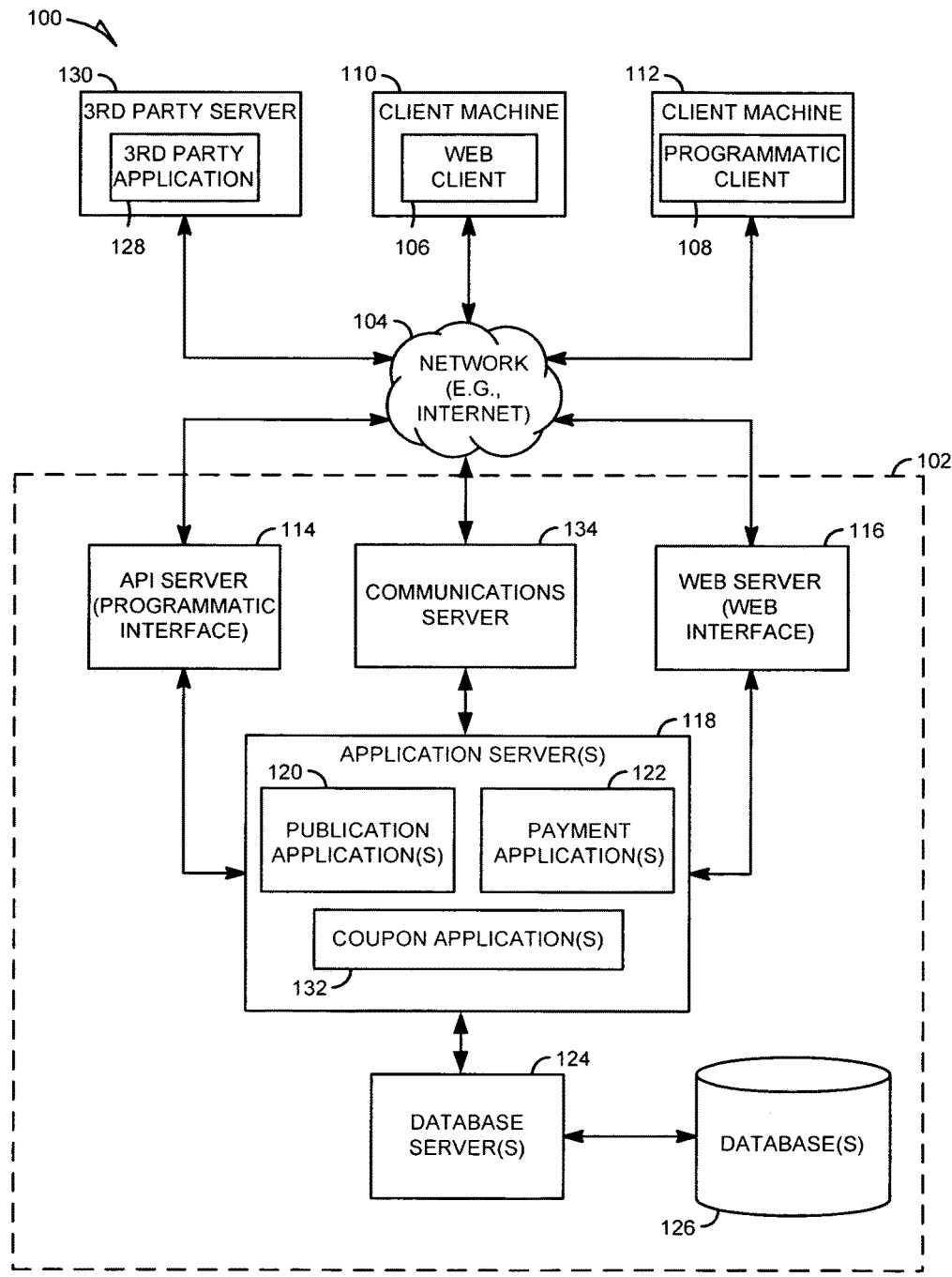
FIG. 1 is a block diagram illustrating an example architecture for a network-based publication system within which methods and systems for dynamically issuing coupons can be implemented.

Example methods and systems for coordinated coupon delivery are described. The systems and methods for coordinated coupon delivery, in some example embodiments may provide a user with coupons accessible via a network-based publication system that issued the coupon as well as various external communication channels, such as electronic mail or standard postal mail. In the following description, for purposes of explanation, numerous specific details are set forth in order to provide a thorough understanding of example embodiments. It will be evident, however, to one skilled in the art that the present invention may be practiced without these specific details. It will also be evident that coupon issuance and coordinated delivery are not limited to the examples provided and may include other scenarios not specifically discussed.

In accordance with an example embodiment, the system can issue a real-time coupon to a user that fits one or more specified criteria while still on the network-based publication system (also referred to as the "site"). In this example, a real-time coupon refers to a coupon issued to a user during a session browsing a network-based publication system. In the context of coupon generation and delivery, both Real-time and instantaneous refer to the generation and/or delivery occurring immediately. However, in the context of any computerized system "immediately," "real-time," or "instantaneous" are all constrained by the time it takes for the process under computer control to occur. In an alternative embodiment, a coupon is issued based on the user's profile stored on the network-based publication system without the user actively accessing the publication system. In either example embodiment, the criteria can include a previous purchase by the user, the user's gender, or a combination of similar parameters. In some examples, the criteria can be the performance of certain actions by the user on the site. For example, on an auction-based site, losing a certain number of auctions could trigger a coupon to be issued. An additional example actions can include buying an item associated with an up-selling campaign, winning a "competitive" auction (e.g., an auction with multiple bids from the same bidder(s)), or buying an item associated with featured accessories. In some examples, the performance actions are monitored in real-time on the site. In certain examples, the performance actions are detected from analyzing historical data. The historical data can be analyzed in regular batches (e.g., daily or weekly). In an example, the performance actions can be determined from a combination of monitored activity and historical data analysis.

Various methods can be used to select users to be eligible to received coupons. For example, one or more coupon issuance models can be developed based on historical transaction data from a network-based publication system. These historical coupon issuance models can then be applied to user's activity using the site. The coupon issuance model can include rules or conditions that the user must satisfy, such as the user purchased an item in a specified category or the purchase price for the purchased item is at least a specified dollar amount. The following is a list of example rules that can be included in a coupon issuance model:

- The user purchased an item using a coupon (or not using a coupon).
- The previous M item(s) that the user purchased were not paid with a coupon in the last D1 days.
- The user has made less than T purchases in the last D2 days.
- The user has redeemed less than K coupons within the same campaign in the last D3 days.
- The user has any outstanding payments (or not). An outstanding payment is defined as:
  - Any incomplete or pending payment of won items in the past 2 weeks.
  - The number of successful bids is not equal to the number of completed payments in the last 2 weeks.
- The user has any live bids (or not). This is defined as:
- The user is the highest bidder on any live auction.
- The end date of this live auction is prior to the expiration date of the dynamic issuance coupon that will be issued.
- The user is a rewards or loyalty program participant (or not).

Additionally, lists of eligible users can be created based on demographics or the individual user's purchase history. User demographics can include age, gender, income level, race, education, hobbies, or any personal characteristic that may be collected or recorded about an individual user. In certain examples, an administrative interface is provided to allow creation of eligible user lists.

Once the system determines a coupon is going to be issued to a user, it can be presented within the network-based publication system through various avenues. For example, the coupon could be delivered to the user through an on-site messaging system, such as while the user is viewing an item relevant to the coupon. A coupon can also be surfaced within the user's account page. The network-based publication system's web interfaces is configurable to provide visual indications of a coupon through a page header common across multiple pages of the site. In certain examples, the coupon may be issued and surfaced during the checkout process.

In certain examples, the system is configurable to coordinate delivery of an issued coupon through the issuing publication system, as described above, as well as through various external communication mechanisms. In one example, the system can concurrently deliver an issued coupon to a user's personal publication system account page and to an electronic mail address associated with the users account. In another example, an issued coupon can be made available within the network-based publication system and also surfaced (displayed) to a user while the user is accessing an on-line search engine, such as www.yahoo.com (provided by Yahoo!, Inc. of Sunnyvale, Calif.). Coordination with the external search engine can be done through placing a cookie on the machine last used by the user to access the network-based publication system. A cookie (also referred to as an HTTP cookie or tracking cookie) is a small piece of computer code (text) stored on a user's computer by a networked system, such as a web site, that allows the networked system to provide personalization or other advanced features. Additional example external communication channels include postal mail, publication system messaging, customer service calls, and social networking applications, such as Twitter (provided by Twitter, Inc. of San Francisco, Calif.). In some of the external communication channel examples, the coupon notification may not include any sort of redemption code, as the coupon is already available for use within the recipients account on the network-base publication system.

In one example embodiment, the user is issued a coupon targeted specifically at the user. Targeted variable value coupons can be used for user-specific, targeted incentives related to rewards programs and courtesy coupon programs. The system can create coupons with different discount amounts, percentage discounts, and expiration dates for individual users. In this embodiment, the targeted coupon can only be redeemed by the user to whom it was issued. In certain examples each individual user can be assigned a unique coupon redemption code. In some examples, the targeted coupons are redeemed based on the user's login credentials with the network-based publication system. In other examples, the targeted coupons are redeemed based on the user's email address. In yet other examples, the targeted coupons are redeemed through the user's method of payment, such as via Paypal™ online payment services (from eBay Inc. of San Jose, Calif.) or a credit card.

In another example embodiment, a user who is eligible to receive a coupon can be placed into a control group. Once placed into a control group, this otherwise eligible user will not receive a coupon. The control groups can be maintained for each coupon campaign, allowing a user to be in a control group with regard to one type of coupon, but receive other coupons. Control group membership can be controlled by setting a percentage of eligible users, for example ten percent of all eligible users will be selected for the control group. In this example, every tenth user that would have been selected to receive a coupon can be placed in the control group. Typical values for the control group percentages are 10%, 20%, 25%, 33%, or 50%, but any desired percent can be supported. The system is configurable to monitor subsequent user activity of users placed in a control group in order to provide for evaluation of coupon campaign effectiveness.

In some examples, the coupon campaigns are controlled through a coupon budgeting engine. The coupon budgeting engine allows a merchandiser, marketing person or individual merchant control the approximate dollar amount of coupons issued through the system. The coupon budgeting engine also allows for control over the coupon campaign's start and end dates, as well as coupon expiration dates. The coupon budgeting engine can be implemented as a stand-alone web application used to submit coupon metadata to a coupon infrastructure hosted by the network-based publication system. As individual unique coupons are issued to each eligible user, the coupon budgeting engine can provide the capability to suspend or cancel individual coupons or an entire campaign.

Further details regarding the various example embodiments described above will now be discussed with reference to the figures accompanying the present specification.

Platform Architecture

FIG. 1 is a block diagram illustrating an example architecture for a network-based publication system within which methods and systems for coordinated coupon delivery can be implemented. The block diagram depicting a client-server system 100, within which an example embodiment can be deployed. A networked system 102, in the example forms of a network-based marketplace, on-line retail site, or publication system, provides server-side functionality, via a network 104 (e.g., the Internet or Wide Area Network (WAN)) to one or more clients 110, 112. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more publication applications 120, payment applications 122, and coupon applications 132. The application servers 118 are, in turn, shown to be coupled to one or more databases servers 124 that facilitate access to one or more databases 126. In some examples, the application server 118 can access the databases 126 directly without the need for a database server 124.

The publication applications 120 may provide a number of publication functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the publication (e.g, marketplace) applications 120. The payment application 122 may also be configured to allow for the redemption of coupons issued by the coupon applications 132. The coupon applications 132 may provide a number of coupon related services and function to users. The coupon applications 132 may be configured to issue coupons directly to users of the networked system 102. Additionally, the coupon applications is configurable to send coupons to users via communication channels external to the networked system 102, such as electronic mail or even standard postal mail. The coupon applications 132 may also be response for surfacing coupon within the networked system 102 during a user session. Surfacing (or presenting) coupons to a user can be done in a manner that is contextually relevant to the portion of the networked system 102 currently being interacted with by the user. While the publication, payment, and coupon applications 120, 122 and 132 are shown in FIG. 1 to all form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various publication, payment, and coupon applications 120, 122 and 132 could also be implemented as standalone software programs, which do not necessarily have networking capabilities.

The web client 106 accesses the various publication, payment, and coupon applications 120, 122 and 132 via the web interface supported by the web server 116. Similarly, the programmatic client 108 accesses the various services and functions provided by the publication, payment, and coupon applications 120, 122 and 132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. Programmatic clients 108 can also be provided that enable sellers to author and manage coupons and coupon campaigns on the networked system 102 in either an on-line or off-line mode.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, publication or payment functions that are supported by the relevant applications of the networked system 102. Additionally, the third party website may provide a user access to view coupons issued by the networked system 102 through the coupon applications 132.

Publication Applications

Figure 2:
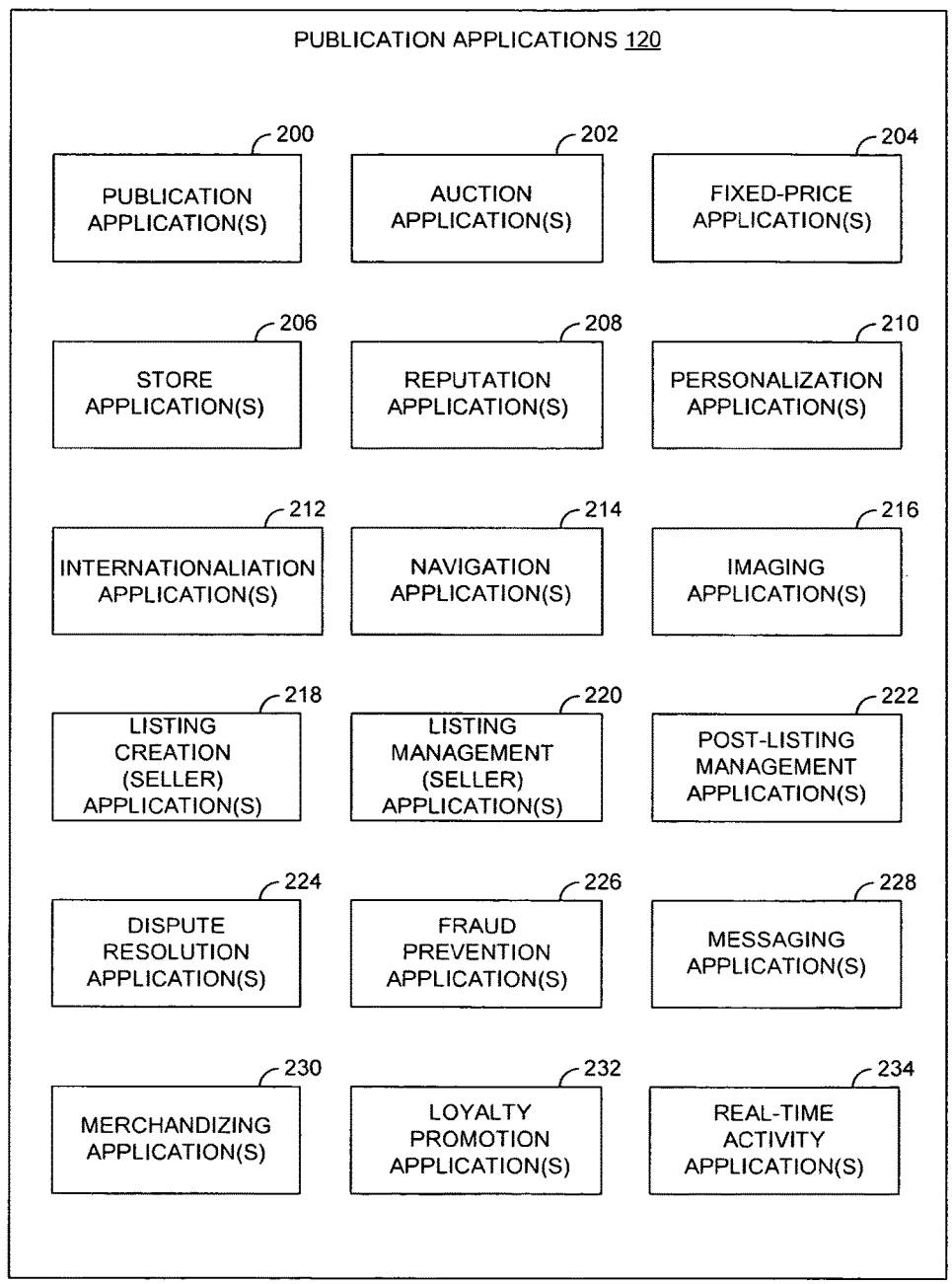
FIG. 2 is a block diagram illustrating multiple applications that, in one example embodiment, provided as part of the network-based publication system some of which can be used for dynamically issuing coupons, among other things.

FIG. 2 is a block diagram illustrating multiple applications 120 that, in an example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller or merchant. Such a virtual store may also offer promotions, incentives and features that are specific and personalized to a relevant seller. The coupon applications 132 or coupon modules 314 is configurable to provide coupon related services through the store applications 206 to individual sellers. In this example, individual sellers can access many of the coupon related functions described herein. For instance, through the coupon applications 132 a seller can create a coupon campaign specific to the seller's personalized "virtual" store.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. A personalized reference page is configurable to display all coupons issued to the user by one of the coupon applications 132 or stored within the coupon infrastructure 304. Further, a personalization application 210 may enable a user to personalize listings and other aspects of their interactions with the networked system 102 and other parties. Additionally, a personalization application can enable a user to view and organize coupons issued by the publication system or individual merchants within the publication system.

The networked system 102 may support a number of publication systems that are customized, for example, for specific geographic regions. A version of the networked system 102 may be customized for the United Kingdom, whereas another version of the networked system 102 may be customized for the United States. Each of these versions may operate as an independent publication system, or may be customized (or internationalized) presentations of a common underlying publication system. The networked system 102 may accordingly include a number of internationalization applications 212 that customize information (and/or the presentation of information) by the networked system 102 according to predetermined criteria (e.g., geographic, demographic or publication system criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications. Certain navigation applications may be configured to surface coupons relevant to the search or browsing pages delivered in response to a user's query.

In order to make listings, available via the networked system 102, as visually informing and attractive as possible, the publication system applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). The messaging applications 228 can also be used to deliver coupons generated by the coupon applications 132 to users on the networked system 102. Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks. The messaging applications 228 may also be configured to communicate over certain social networking platforms, such as Twitter or Facebook. Communication with a social networking platform may require installation of an application or plug-in within a user's social network account.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers. The merchandising applications 230 may also provide an additional mechanism for sellers to create and manage coupon campaigns within the networked system 102.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed. The loyalty promotion applications 232 may work in conjunction with the coupon applications 132 to reward loyal users with valuable coupons for use within the networked system 102.

Real-time activity applications 234 support various functions within the networked system 102 by providing real-time information about user activities within the networked system 102. For example, the real-time activity applications 234 can provide information to the messaging applications 228 or personalization applications 210 to enhance a user's experience or improve a seller's ability to move merchandise. In certain examples, the real-time activity applications 234 provide real-time activity data to the coupon applications 132 enabling real-time, instantaneous delivery of user targeted coupons. Real-time activity data, delivered by the real-time activity applications 234, may also be used to coordinate delivery of coupons within the networked system 102 and through external communications channels supported by the messaging applications 228. The real-time activity data can also be used to trigger contextual display of coupons already issued to the user. For example, if the user is viewing an item listing for a digital camera, this information can be provided to the coupon applications 132, which can then trigger the display of a coupon from a seller specializing in digital cameras.

Coupon Modules

Figure 3:
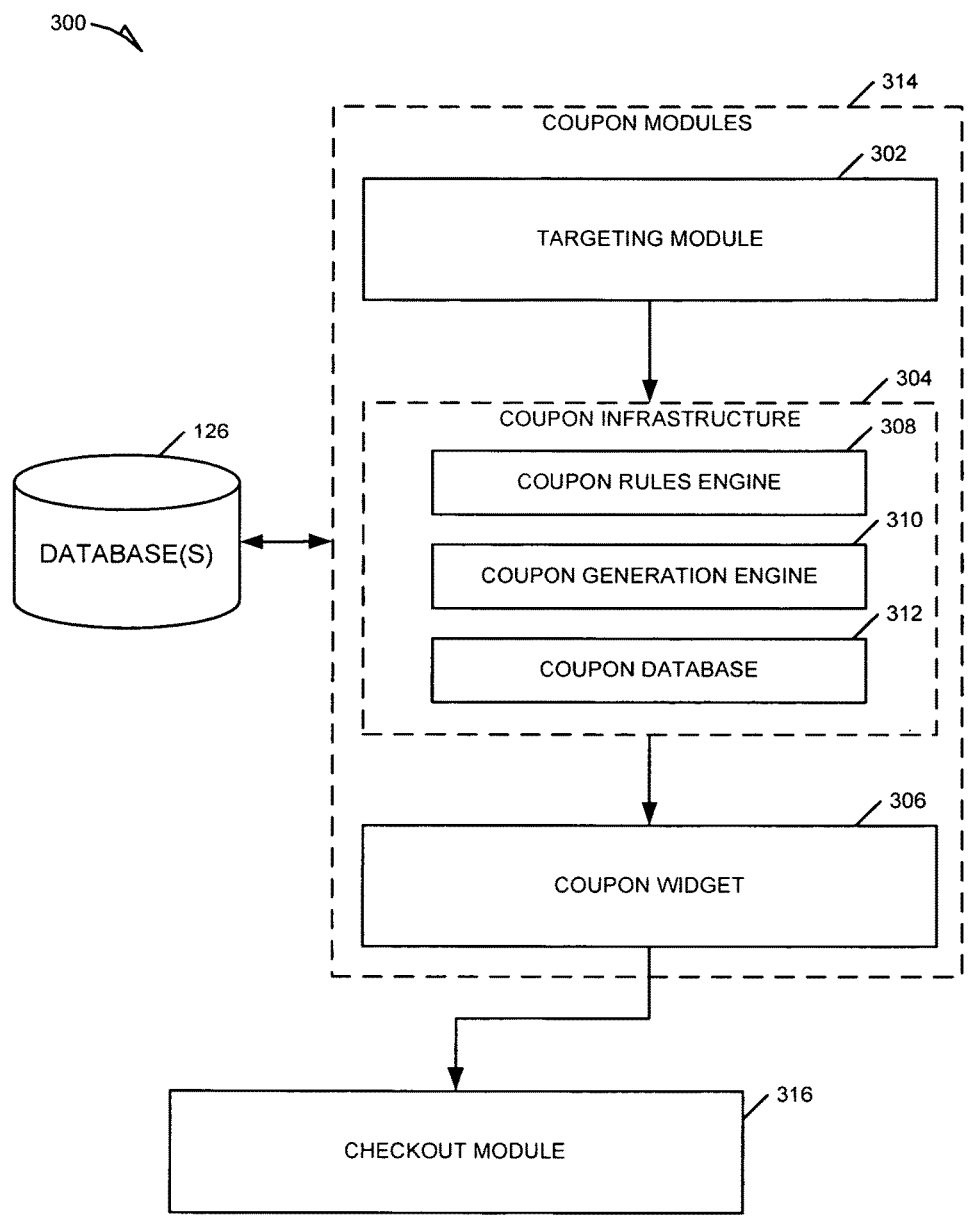
FIG. 3 is a block diagram illustrating an example system for dynamically issuing coupons.

FIG. 3 is a block diagram illustrating an example system 300 for generating coupons within a system for coordinated coupon delivery. As shown in the example illustrated by FIG. 3, the system 300 can include coupon modules 314, a checkout module 316 and the databases 126. The coupon modules 314 can include a targeting module 302, a coupon infrastructure 304, and a coupon widget 306. In certain examples, the coupon infrastructure 304 includes a coupon rules engine 308, a coupon generation engine 310, and a coupon database 312. The coupon database 312 can be a separate stand-alone database within the coupon infrastructure 304 or it can be one or more interconnected tables within the databases 126, such as the coupon table 1118 illustrated in FIG. 11.

The targeting module 302 is configurable to create coupon issuance models used by the coupon infrastructure 304 to generate coupons for users of the networked system 102. The targeting module 302 can also be configured to create lists of users that are eligible to be issued coupons. In an example, the targeting module 302 receives instructions from one or more of the publication system applications 120 to pull data from the databases 126 to create lists of coupon eligible users. In certain examples, the targeting module 302 stores various coupon issuance models within the databases 126 for use in future couponing campaigns. The coupon issuance models can include various conditions that are evaluated by the coupon infrastructure 304 in determining whether to issue a coupon. In certain examples, the targeting module 302 can deliver coupons through the messaging applications 228, based on a list of eligible users.

The coupon infrastructure 304, in some example embodiments, is responsible for evaluating coupon issuance models, generating and storing coupons for use by users within the networked system 102. In an example, the coupon infrastructure 304 includes a coupon rules engine 308 that can be used to evaluate one or more coupon issuance models. In certain examples, the coupon rules engine 308 also determines whether a targeted user is on a list of users eligible to receive a coupon, before signaling the coupon generation engine 310 to create a coupon. In another example, the coupon rules engine 308 can select contextually relevant coupons for presentation to the user. In this example, the coupon rules engine 308 receiving information regarding a user's current location within the networked system 102 to determine which coupons may be relevant for display. In certain examples, the coupon generation engine 310 can generate a coupon represented by coupon metadata, shown below in Table 1 as example XML tags. In other examples, the coupon generation engine 310 generates coupons through interaction with the coupon database 312. The coupon database 312, in some example embodiments, stores all generated coupons for use within the networked system 102. The coupon infrastructure, in certain example embodiments, is configured to transmit coupons through communication channels external to the networked system 102. In some examples, the coupon infrastructure uses the messaging applications 228 to handle communication of coupons.

TABLE 1

Example Coupon Metadata

```
<CouponMetadata>
    <summary_action>insert</summary_action>
    <external_id>123456</external_id>
    <program_code>CRTYS200</program_code>
    <adjacency_id>0</adjacency_id>
    <incentive_type>3</incentive_type>
    <coupon_value_type>1</coupon_value_type>
    <coupon_application_type>1</coupon_application_type>
    <coupon_type>1</coupon_type>
    <iso_country_code>US</iso_country_code>
    <language>EN</language>
    <iso_currency_code>USD</iso_currency_code>
    <budget_amount>300000</budget_amount>
    <start_date>02/01/2008 14:59:59</start_date>
    <expiration_date>05/23/2008 00:59:59</expiration_date>
    <category_id>14339, 12314, 92382</category_id>
```

TABLE 1-continued

Example Coupon Metadata

```
    <status>1</status>
    <display_message> <![CDATA[This is a custom description. The offer
is {offer} %, up to ${max}. Min purchase is ${min}.]]>
    </display_message >
    <min_purchase_amount>200</min_purchase_amount>
    <coupon_max_discount_amount>500</coupon_max_discount_amount>
    <faq_url>http://www.mpname.com/us_termsfaq.html</faq_url>
    <coupon_discount_percent>14.5</coupon_discount_percent>
    <incntv_max_usage_count>5</incntv_max_usage_count>
</CouponMetadata>
```

The coupon widget 306 is configurable to present coupons generated by the coupon infrastructure 304 to a user accessing the networked system 102. In certain examples, the coupon widget can also be configured to communicate coupons over various communication channels, both internal and external to the networked system 102, such by leveraging the messaging applications 228. In some examples, the coupon widget 306 may be a small applet that runs within a third party application 128 to display coupons to registered users of the network system 102. For example, a Facebook application can incorporate the coupon widget 306 and be configured to display coupons to a user within the user's Facebook account. In these examples, the coupon widget 306 is configurable to communication through the API server 114 in order to access the coupon infrastructure 304. In these various examples, the coupon infrastructure 304 can coordinate delivery of a targeted coupon to a user through both the coupon widget 306 and the messaging applications 228. The coupon widget 306 can also present contextually relevant coupons selected by the coupon rules engine 308 based on current user interactions with the networked system 102.

The checkout module 316 is configurable to allow a user of the networked system 102 to complete the purchase process. The coupon widget 306 is configurable to work in conjunction with the checkout module 316 to present relevant coupons to the user during the checkout process. In some examples, the coupon widget 306 can display only those coupons that can be applied to the items the user is attempting to checkout using the checkout module 316. In certain examples, the checkout module 316 can support selection of coupons stored in the coupon infrastructure 304 as well as entry of legacy coupon codes.

Coupon System

Figure 4:
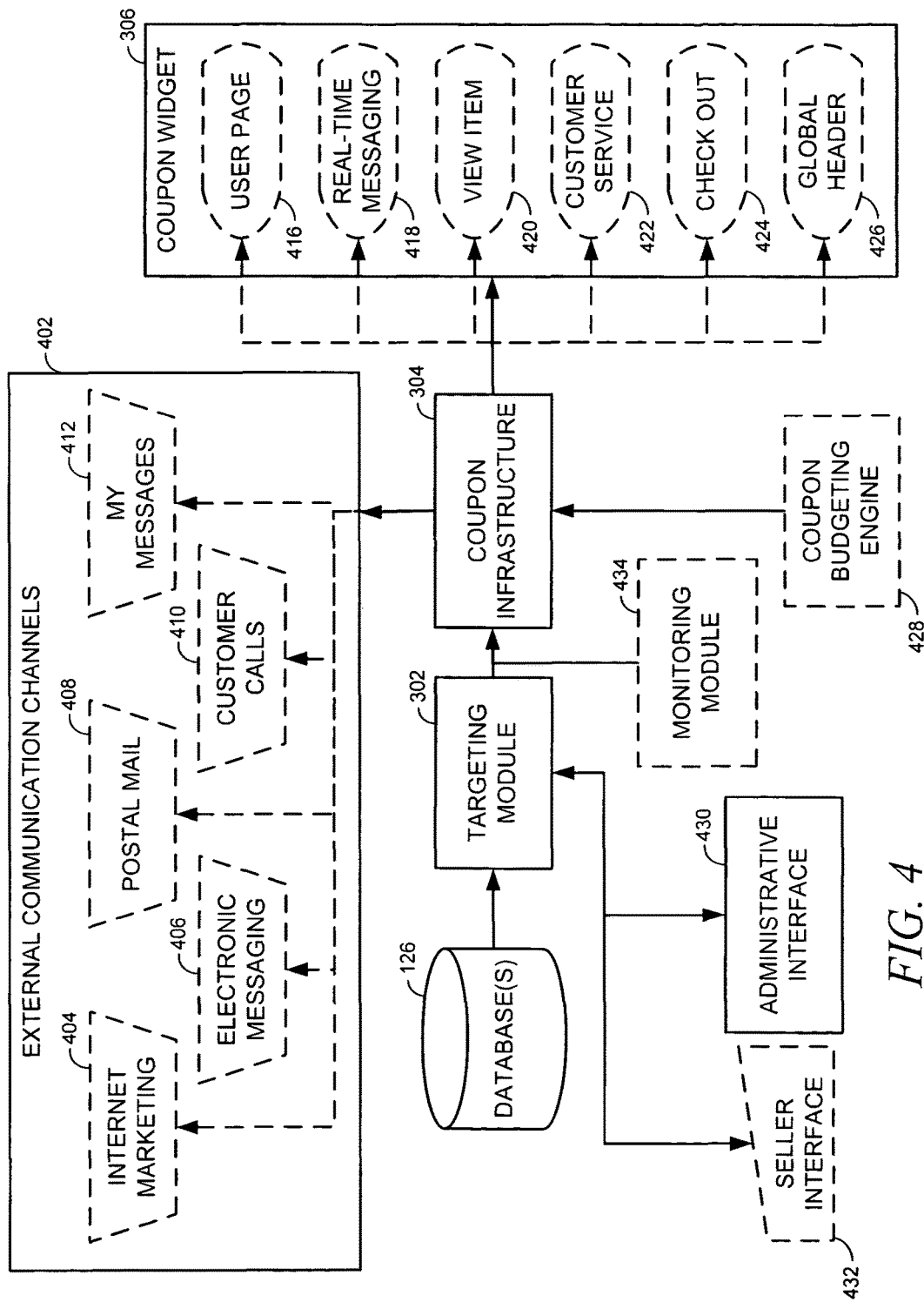
FIG. 4 is a block diagram illustrating an example coupon system, which can be implemented as part of a network-based publication system.

FIG. 4 is a block diagram illustrating an example coupon system 400, which can be implemented as part of a networked system 102. In an example embodiment, the coupon system 400 includes the targeting module 302, the coupon infrastructure 304, the coupon widget 306, external communication channels 402, an administrative interface 430, and the databases 126. In some examples, the coupon system 400 also includes a seller interface 432, a monitoring module 434, and a coupon budgeting engine 428.

The coupon system 400, in an example embodiment, includes various external communication channels, such as internet marketing 404, electronic messaging 406, postal mail 408, customer calls 410 and my messages 412. In an example, the internet marketing channel 404 can be used to present targeted user coupons to registered users of the network system 102 while the user is accessing a third party's web site or application. For example, the internet marketing channel 404 is configurable to deliver targeted coupons through Internet search engines, such as www.yahoo.com (provided by Yahoo!, Inc. of Sunnyvale, Calif.). In some examples, the external communication channels 402 can also be supported through the messaging applications 228. For example, the my messages 412 channel can be an external messaging system operating on the networked system 102 and supported by the messaging applications 228.

In various example embodiments, the coupon widget 306 is configurable to surface coupons within the network system 102 through a user page 416, real-time messaging 418, a view item listing page 420, a customer service interface 422, a checkout mechanism 424, and a global web page header 426. The user page 416 can be provided through the personalization applications 210 and is configurable to display information associated with a registered user's interactions with the network system 102. In an example, real-time messaging 418 is configurable to display messages, such as coupons, to a user browsing on the network system 102. For example, a user may enter a search request on the network system 102, the search request can return a list of results and a portion of the web page may include a message delivered through real-time messaging 418. The message delivered through real-time messaging can include one or more coupons issued to the user relevant to the search results. In certain examples, each web page generated by the network system 102 can include a common global header 426 with a section dedicated to displaying information associated with a registered user. In an example embodiment, the coupon infrastructure 304 coordinates coupon delivery between the external communication channels 402 and the coupon widget 306. For example, a coupon generated for a specific user can be delivered to the networked system 102 via the coupon widget, while the same coupon is sent via electronic messaging 406 to the users cellular phone. In this example, within the networked system 102, the coupon widget 306 may surface the coupon within the user's user page 416 or through the global header 426.

In an example, the administrative interface 430 can be used to setup coupon campaigns within the targeting module 302. Coupon campaigns can include the creation of a list of users eligible to receive a coupon as well as one or more rules or conditions, which may be stored in a coupon issuance model. In certain examples, the administrative interface 430 can be used to create and store, within the database 126, coupon issuance models for future coupon campaigns. In these examples, a coupon campaign refers to the creation of a promotion within the networked system 102 to encourage users to make purchases through issuing coupons, such as five (5) dollars off your next purchase or ten percent (10%) off an iPod brand music player (from Apple, Inc. of Cupertino, Calif.). In some examples, the coupon budgeting engine 428 can be used to configure the financial aspects of a coupon campaign, as well as the start and end dates of the campaign. For example, through the coupon budgeting engine 428, a seller or merchandiser can configure a coupon campaign to issue up to five thousand dollars in a certain type of coupon and have the campaign run from May 1$^{st}$ through September 1$^{st}$. In another example, the coupon budgeting engine 428 can monitor the coupon infrastructure 304 to determine when a pre-selected dollar amount of issued coupons have been redeemed, as a measure of when to end a coupon campaign.

In some example embodiments, the monitoring module 434 is configurable to track the activity of a user interacting with the networked system 102. The monitoring module 434 can provide this real-time activity information to the coupon infrastructure 304 for use in evaluating whether a user has met the necessary conditions to issue a coupon. For example, a certain coupon campaign may require that a user view three listings within a certain category during a single user session prior to issuing a coupon. In this example, the monitoring module 434 can track the user's interactions and provide real-time information to the coupon rules engine 308 where the condition can be evaluated. As soon as the user visits the third listing within a specified category, the coupon rules engine 308 can trigger the coupon generation engine 310 to issue a coupon to the user, which can then be presented through the coupon widget 306. In this example, the coupon widget 306 can present the coupon during the current user session, while the user may still be considering a purchase. The monitoring module 434 can also provide information to the coupon infrastructure to enable contextual display of coupons based on a users current location within the networked system 102.

Coordinated Coupon Deliver Methods

Figure 5:
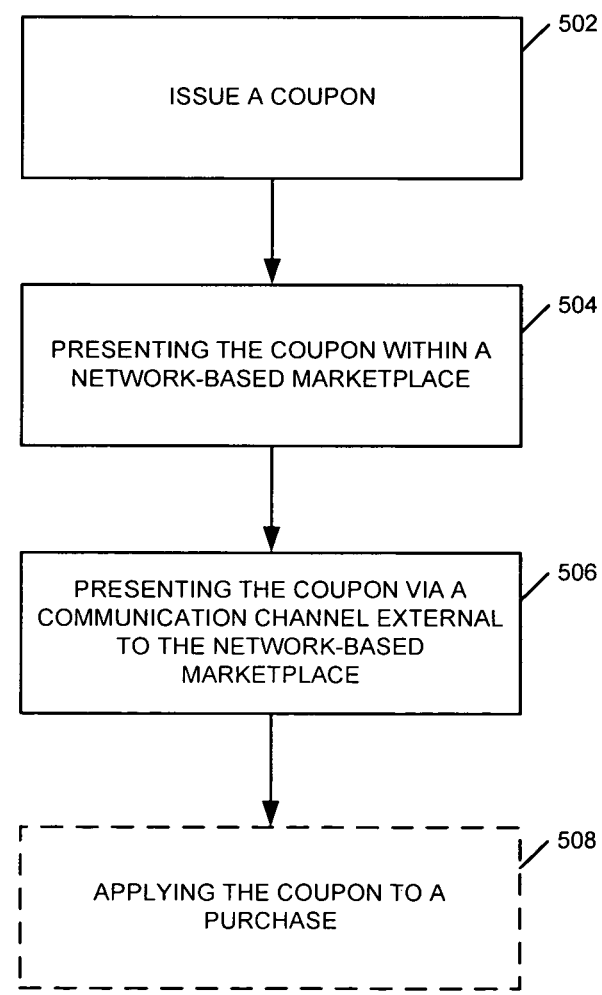
FIG. 5 is a flow chart illustrating an example method for coordinated coupon delivery.

FIG. 5 is a flow chart illustrating an example method 500 for coordinated coupon delivery. The method 500 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the coupon applications 132 illustrated in FIG. 1. In another embodiment, the processing logic resides within the coupon modules 314 illustrated in FIG. 3. The processing logic may also partially or completely reside within the coupon system 400 illustrated in FIG. 4. The method 500 may be performed by the various modules discussed above with reference to FIGS. 1 through 4. Each of these modules may comprise processing logic.

As shown in FIG. 5, the method 500 includes operations for issuing a coupon 502, displaying the coupon within a network-based publication system 504, and presenting the coupon via an external communication channel external to the network-based publication system 506. The method 500 commences at operation 502 with the coupon infrastructure 304 issuing a coupon to a user of the networked system 102. In an example embodiment, the coupon generation engine 310 can handle the coupon generation. Coupons can be issued targeted to individual users of the networked system 102. A targeted coupon can only be redeemed by the user to whom was issued. An example coupon data structure that associates a targeted coupon with a particular user is discussed below in reference to FIG. 11. User identification on the networked system 102 can be accomplished through authenticating the user against a stored user profile, typically a username and password combination. In some embodiments, the username can uniquely identify the user externally to the networked system 102, for example an electronic mail address. In another embodiment, authentication can include a security device, such as a two-factor digital ID token (e.g., RSA SecurID from RSA Security of Bedford, Mass.). In yet another embodiment, the networked system 102 can use a tracking cookie (HTTP cookie) to identify a particular user, providing little true authentication of the user's credentials. The level of authentication employed can be dependent on the amount of sensitive information retained within the networked system 102 regarding a particular user. In any of the described example embodiments, the networked system 102 may not be able to ensure a user's identity beyond the authentication mechanisms in use.

In an example, the method 500 continues at operation 504 displaying the issued coupon within the networked system 102. Once a coupon has been issued by the coupon infrastructure 304, the coupon can be passed to the coupon widget 306 for display through various avenues within the networked system 102. For example, the coupon widget 306 is configurable to display the coupon while a user is viewing a related item listing using view item 420. In another example, the coupon widget 306 is configurable to display the coupon during the checkout process 424. The coupon widget 306 is configurable to surface a coupon through all of the mechanisms depicted in FIG. 4 including a user page 416, real-time messaging 418, view item 420, customer service 422, checkout 424 and a global header 426. Additionally, the coupon widget 306 is a configurable and adaptable mechanism that can be easily extended to display coupons through additional user interface mechanisms not depicted.

As shown in FIG. 5, the method 500 completes at operation 506 delivering the coupon via a communication channel external to the networked system 102. In this example embodiment, delivery via external communication channels 402 (or the messaging applications 228) can be accomplished concurrently with display via the coupon widget 306 within the networked system 102. A user targeted coupon can be delivered via some form of electronic messaging 406, such as to the user's e-mail address. At the same time, the user can access the same coupon by logging in to the networked system 102 and accessing the user's user page 416. In another example embodiment, delivery or presentation via external communication channels 402 can occur asynchronously to presentation within the networked system 102. For example, the coupon infrastructure 304 can send a coupon via postal mail 408 or provide the coupon via a customer sales call 410. Enabling the presentation of a coupon through various communication channels enables merchandisers to influence a user's online purchase decisions in multiple venues, while only making a single offer.

In an example embodiment, the method 500 can include an operation 508 for applying the coupon to a purchase by the user. In this example, the user can redeem the coupon during the checkout process by selecting the coupon from a list of available coupons. In another example, the user can select the coupon for application to the purchase of a certain item while viewing that item's listing within the networked system 102. In certain examples, the user can redeem the coupon during the same user session in which the coupon was issued. In an example, the payment system selected by the user within the checkout module 316 will redeem the coupon against the purchase.

Figure 6:
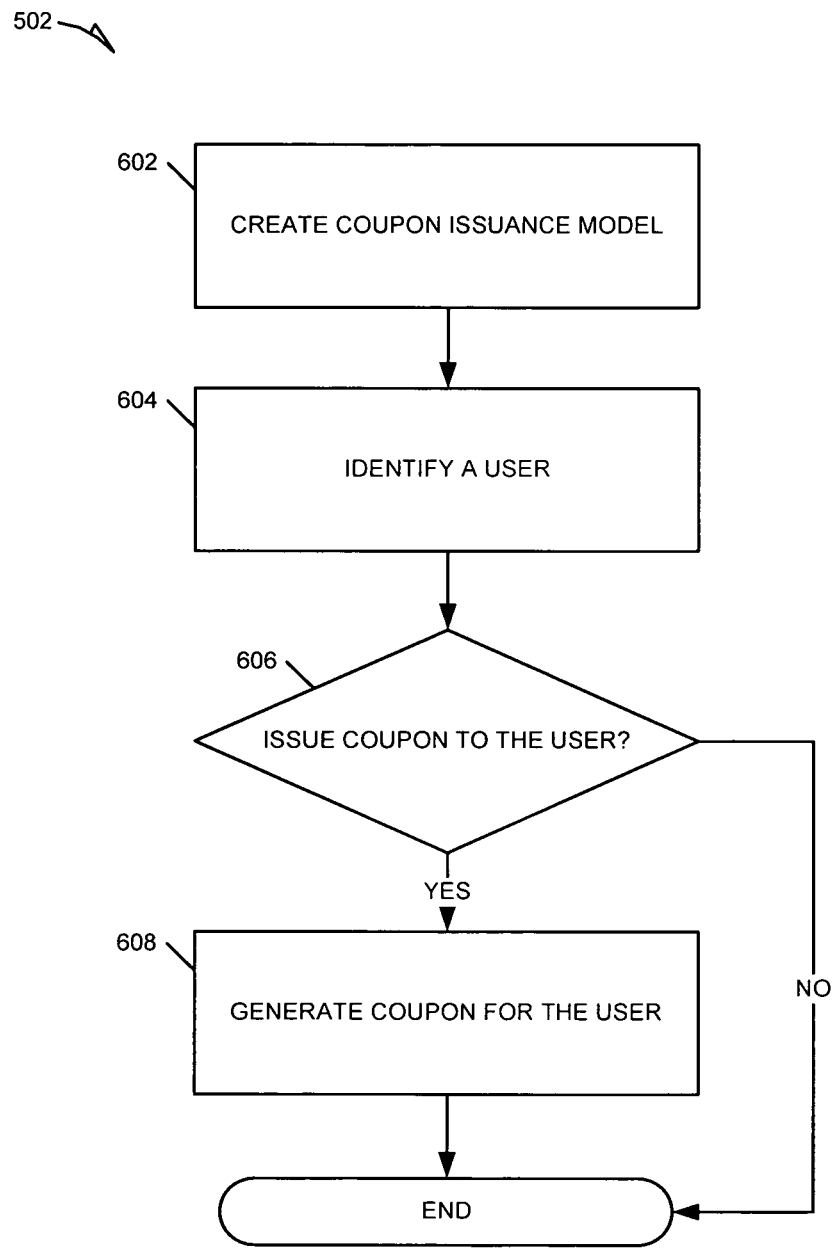
FIG. 6 is a flow chart illustrating an example method for issuing a coupon.

In some example embodiments, issuing a coupon at operation 502 can be broken out into various operations, as depicted in FIG. 6. FIG. 6 is a flow chart illustrating an example method 502 for issuing a coupon. The method 502 includes operations for creating a coupon issuance model 602, identifying a user 604, deciding whether to issue a coupon to the user 606, and generating a coupon for the user 608. The method 502 can commence at operation 602 with the targeting module 302 creating a coupon issuance model. The coupon issuance model can be created by the targeting module 302 and stored in the database 126. The coupon issuance model can be used by the coupon infrastructure 304 to determine which users should receive coupons and under what conditions. In some examples, the coupon issuance module includes a series of rules or conditions for coupon issuance. Table 2 includes some example rules that can be used within a coupon issuance model.

TABLE 2

Coupon Issuance Conditions

User purchased an item from category X
User purchased an item over a specified price
User made a purchase using a coupon (or not using a coupon)
User made M non-coupon transactions in the last D1 days
User has less then (more than) T purchases in the last D2 days
User has redeemed less than K coupon with the same campaign in the last D3 days
User won (or lost) a competitive auction
User has (or has no) live bids on auction listings
User lost (or won) an auction
User has outstanding payments (or no outstanding payments)

Many of the example conditions include a positive and negative option for the condition, such as the user won an auction or the user lost an auction. These example conditions can be combined to generate more complex rules, such as the user has lost an auction for an item within a specified category. Coupon issuance conditions can include any user activity that is logged by the network system 102. Additionally, conditions can include user profile data (e.g., demographic information), such as gender or income level, provided this information is available within user profile data stored by the networked system 102. In some examples, user profile data is entered by the user upon registration for an account on the networked system 102. In other examples, the user profile data can be harvested from observing user activities on the networked system.

In an example, the method 502 continues at operation 604 with the monitoring module 434 identifying a user accessing the networked system 102. In an example, an identified user identified can be a registered user within the networked system 102. In this example, the coupon infrastructure 304 can access profile data stored in the databases 126 on this user. In certain examples, the coupon infrastructure 304 can also access activity data associated with the user. The activity data can be historical activity data stored in the databases 126, which can include purchase history, browsing activity history and frequency of visits to the networked system 102. Additionally, the activity data can be real-time activity provided by the real-time applications 234, which can include information about the user's current session as well as any recent sessions not yet stored in the databases 126.

At operation 606, in an example embodiment, the method 502 continues with the coupon infrastructure 304 determining whether to issue a coupon to the user identified at operation 604. In certain examples, the rules engine 308 evaluates information provided by the targeting module 302 and the monitoring module 434 to determine whether to issue a coupon If the identified user is not eligible to receive a coupon, for example the user may not be on an eligible user list controlling the coupon campaign, then method 502 ends without issuing a coupon. However, if the identified user is eligible to receive and coupon and meets the condition within the coupon issuance model, then method 502 continues at operation 608.

In certain examples, determining whether to issue a coupon to an identified user can include accessing the users profile data from the databases 126 and applying the profile data against the coupon issuance model. In some examples, activity data associated with the user can also be accessed, from either the databases 126 or the real-time activity applications 234. The coupon infrastructure 304 can then determine if any of the user's activity data satisfies the conditions defined within the applicable coupon issuance model. If the conditions laid out in the coupon issuance model are satisfied, then the method 502 continues to generate a coupon for the user at operation 608.

In an example, the method 502 continues at operation 608 with the coupon generation engine 310 generating a coupon for the identified user. The coupon can be generated by the coupon infrastructure 304 and stored in the coupon database 312. In certain examples, the coupon generated by the coupon infrastructure 304 can be unique to the identified user. The unique coupon may also be referred to as a targeted coupon. Targeted coupons can only be redeemed by the user to whom the coupon was issued. In some examples, the user is identified at the time of redemption by the user's registration with the networked system 102. In another example, the user is identified at the time of coupon redemption by information unique to the user, such as an electronic mail address, postal mailing address, or identification associated with a method of payment. Targeting coupons to individual users allows for closer monitoring of user behavior and further enhances a merchandiser or seller within the networked system 102 to target specific user groups.

In addition to user targeted coupons, the networked system 102 supports coupons funded by the organization providing the networked system 102 (e.g., a marketplace host) as well as individual merchants (sellers) offering items for sale within the networked system. In an example, the marketplace host will fund coupons that can be redeemed against purchases from any merchant selling items within the networked system 102. In some examples, when the marketplace host is funding the coupon, when a user redeems the coupon during a purchase from merchant X, the user (purchaser) will pay the coupon discounted price, but merchant X will receive the full undiscounted purchase price (minus any commissions or seller's fees) from the marketplace host. The networked system 102 can also provide individual merchant's the ability to fund coupon campaigns. In these examples, the merchant can develop their own list of eligible users and coupon issuance models through a seller interface 432.

In an example, once a coupon is generated, at operation 608, the method 502 finishes and the coupon is ready for presentation to a user. In some examples, the coupon infrastructure 304 passes the generated coupon information to the coupon widget 306 for instantaneous presentation to the user through mechanisms such as a view item page 416, real-time messaging 418, or the global page header 426. In an example, the coupon widget 306 can make the issued coupon available to the user through multiple user interface screens hosted by the networked system 102. The coupon system 400 enables dynamic instantaneous issuance and delivery of user targeted coupons through combination of user tracking and real-time display capabilities. The descriptions associated with FIGS. 5 and 7 provide further details on additional supported display and delivery options within the networked system 102.

Figure 7:
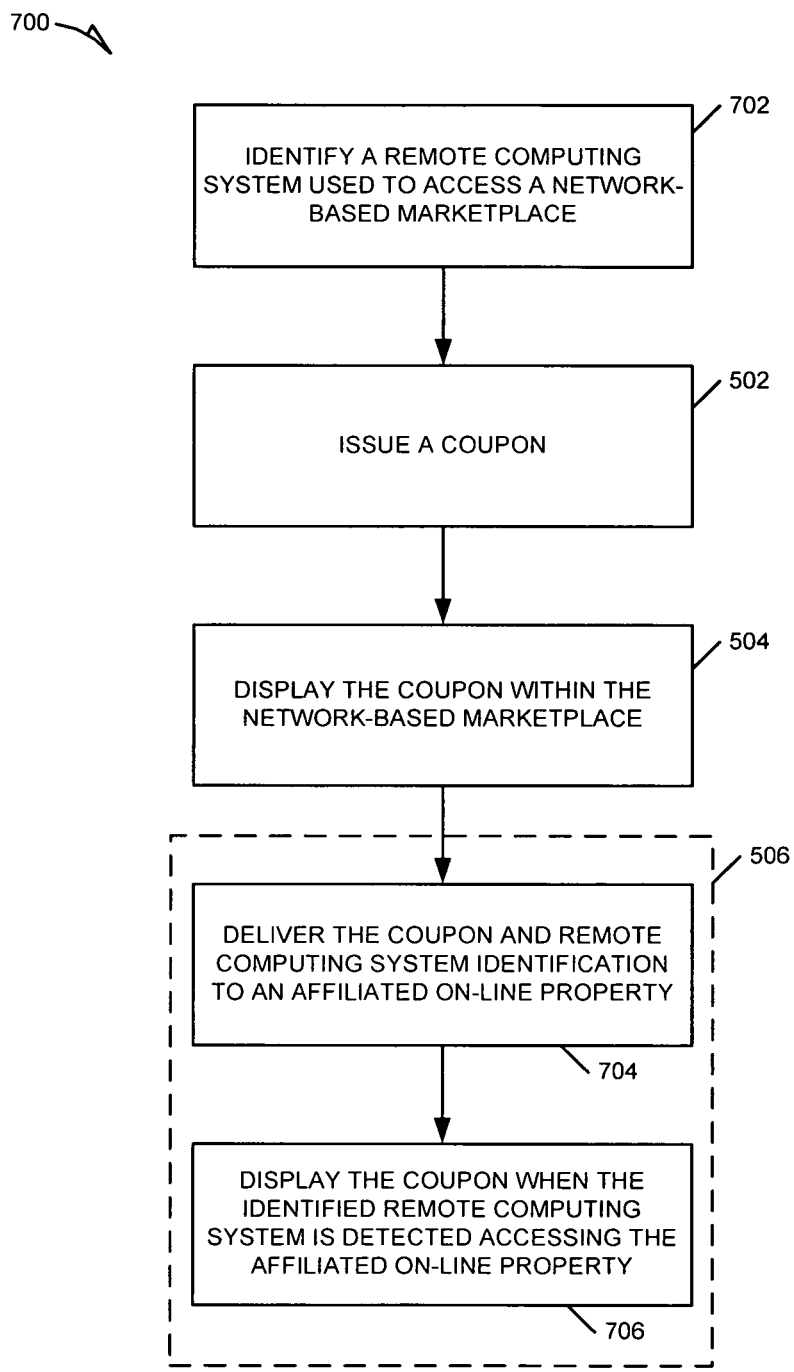
FIG. 7 is a flow chart illustrating an example method for coordinating coupon delivery across multiple networked systems.

FIG. 7 is a flow chart illustrating an example method 700 for coordinating coupon delivery across multiple networked systems. The method 700 expands on the basic operations illustrated in FIG. 5. The method 700 commences at operation 702 with the web server 116 identifying a remote computing system used to access the networked system 102. In this example embodiment, identifying the remote computing system can include placing a tracking cookie (e.g., HTTP cookie) on the device so that the networked system 102 or another networked system can determine that this device has been used to access the networked system 102. In certain examples, the cookie will also identify the individual user registered with the networked system 102. The use of "tracking cookie" is intended to broadly cover any known or future developed mechanism for tracking individual computer devices (or internet browsing applications) that is able to persist between sessions of interaction with a particular networked system, such as networked system 102, or web site.

As shown in FIG. 7, the method 700 continues at 502 with the coupon infrastructure 304 issuing a coupon and at 504 with the networked system 102 displaying the issued coupon, these operations are further detailed above relation to FIG. 5. The method 700 next provides additional detail on an example embodiment of operation 506 for delivering a coupon through external communication channels. In this example, the method 700 delivers the issued coupon and information regarding the identification of the remote computing system 110, 112 used by the user to access the networked system 102 to an affiliated on-line property at 704. In this example, the affiliated on-line property can be an internet search engine, such as www.yahoo.com (provided by Yahoo!, Inc. of Sunnyvale, Calif.). Communications with the affiliated on-line property can be handled by the internet marketing component 404 or by the messaging applications 228. Other example affiliated on-line properties can include, corporate web sites, commerce sites, news or media sites, blogs, or social networking sites, such as Facebook (developed by Facebook, Inc. of Palo Alto, Calif.).

Once the affiliated on-line property receives the information regarding the issued coupon and remote computing system identification, the coupon can be displayed to the user accessing the affiliated on-line property with the identified remote computing system at operation 706. For example, the coupon and computing system identification can be sent to Yahoo! enabling display of the user targeted coupon to the user when doing an internet search using the identified remote computing system. In this example, the user can select (e.g., click on) the coupon displayed as part of a search results screen, for example as a banner advertisement, and be directed to the networked system 102 where the coupon can be available for use in making a purchase.

Figure 8:
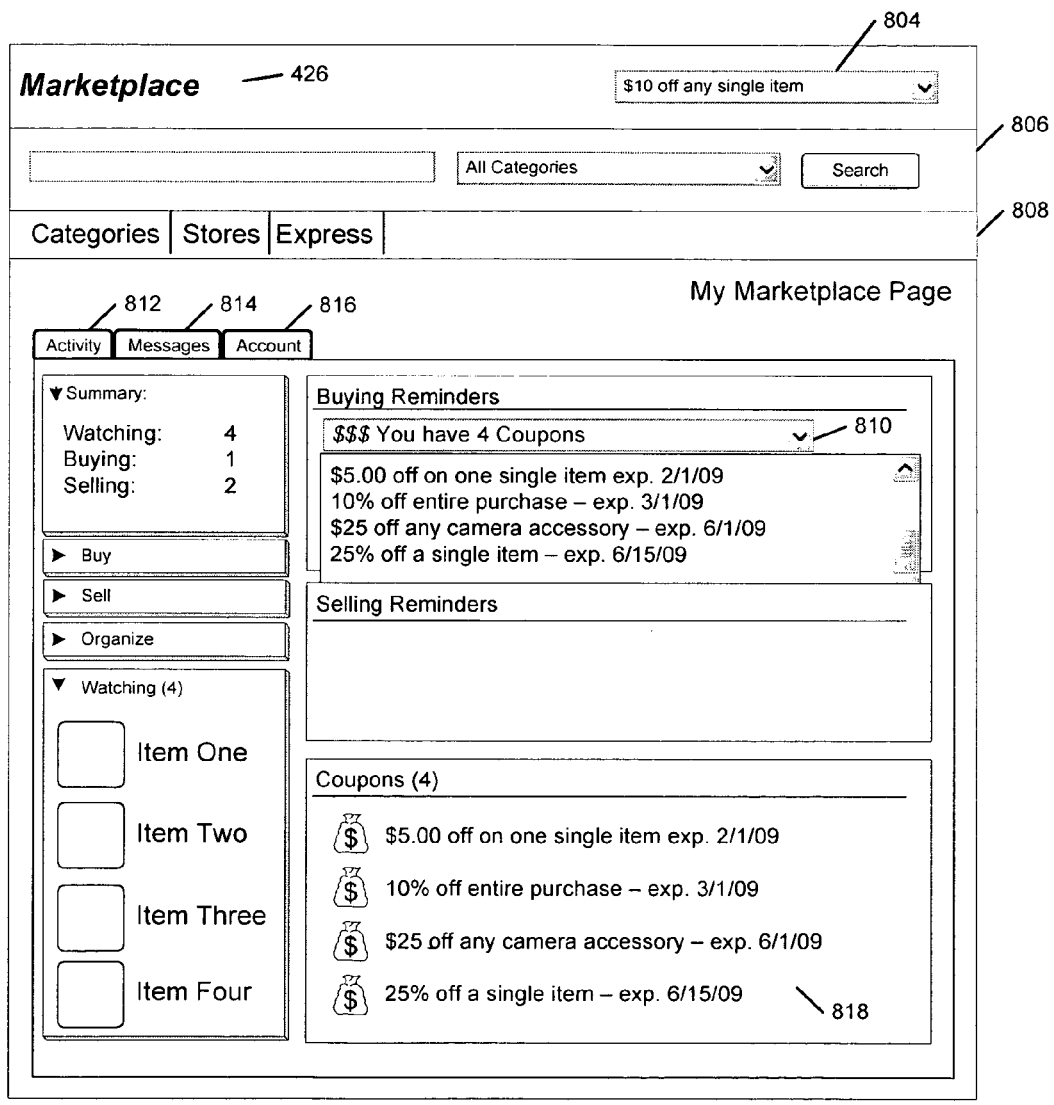
FIG. 8 is a block diagram illustrating an example user account page available within a network-based publication system.

FIG. 8 is a block diagram illustrating an example user account page 416 available on the networked system 102. The user account page 416 includes various major sections including the global header 426, a search bar 806, secondary navigation 808, an activity tab 812, a messages tab 814 and an account tab 816. FIG. 8 illustrates the activity tab 812 portion of the user account page 416 to highlight how the coupon widget 306 can display coupon information. Element 804 is an example coupon widget 306 display within the global header 426. In this example, the element 804 can be a drop-down type list display element allowing a user to quickly view all available coupons. While element 804 is depicted within the global header 426 on the user account page 416, the global header 426 can be used on all user interface screens provided by the networked system 102.

Element 810 illustrates another drop-down list within the activity tab 812 displaying coupon information to the user. In some examples, the element 810 can be implemented as a simple hyperlink or pop window control. Element 818 illustrates yet another available coupon display that simply lists available coupons by expiration date. In certain example embodiments, the user account page 416 is configurable by the user to include any number of the illustrated coupon display mechanisms. Additionally, each of the coupon display mechanisms is configurable to display the coupons in various manners, such as by expiration date, by value, or by issue date, for example.

FIG. 9 is a block diagram illustrating an example checkout page 424 demonstrating example coupon display capabilities. The checkout page 424 includes a global header 426, a checkout header 902, shipping address 904, and order details 906. In this example, the order details 906 includes various coupon related displays, including an applied coupon discount 908, redeem a coupon section 910, select other available coupons 914 and a final coupon discount calculation 916. The applied coupon discount 908 can be displayed as shown, when the coupon can be applied to the entire purchase. Alternatively, if the coupon only applies to a single item, then the coupon discount 908 can be displayed as applied to a single item. Selecting a different coupon from the available options 912 within the "redeem a coupon" section 910 can affect the coupon discount 908 display. The "redeem a coupon" section 910 includes a list of available coupons 912. The list of coupons 912 can be arranged according to highest value (e.g., best discount). The list of coupons 912 can also be arranged according to expiration date of the coupons, allowing a user the opportunity to select a coupon that may expire soon. If the user has more coupons that can be displayed within the list of coupons 912, then a drop-down or pop up control 914 can be included to allow the user to select from all available coupons. The "enter a coupon code" section 918 can be included to support entering coupon codes not displayed through one of the coupon widget 306 mechanisms. In certain examples, the "enter a coupon code" section 918 may only be used to support legacy coupon campaigns.

Certain example embodiments may facilitate delivery of coupons or promotional information to a user browsing an online publication system, such as the networked system 102. Some example embodiments may also facilitate delivery of coupons or promotional information that is specifically targeted to the individual user browsing the online publication system. Additional example embodiments may facilitate redemption of coupons issued during a particular user-session through selection from a list of available coupons. In certain example embodiments, the publication system may be able to present all coupon received by a user that are still available for use during the checkout process. Yet other example embodiments may facilitate coordinated delivery of coupons and promotional information targeted at a specific user through multiple communication channels.

An example embodiment that facilitates delivery of coupons or promotional information to a user browsing an online publication system improves the usability of the system for the user. In certain publication systems, the user can search for items the user may wish to purchase. Enabling the publication system to issue a coupon or similar incentive while the user is actively searching for items the user may wish to purchase, improves the user experience and increases the likelihood the user will make a purchase. Providing a user with an immediate incentive to make a purchase may also reduce network traffic, as the user may reduce the amount of browsing of additional purchase options.

As discussed above, coupons are typically redeemable by anyone that receiving them and are typically delivered without explicit knowledge of the identity of the recipients. Allowing a seller or publication system to target specific users to receive coupon or promotional information can improve the usefulness of the publication system. For example, if a seller has excess inventory of a certain type of item and needs to crease sales of that item, it would be highly efficient to send a coupon to users already searching for that type of item, instead of sending out an anonymous coupon to a large group of users. Targeting the distribution of coupons may reduce network traffic and/or e-mail storage space requirements as the amount of junk e-mail can be reduced.

The typical user of a networked publication system may receive a large number of promotional offers and coupons through e-mail or other delivery mechanisms. When the user is ready to make a purchase, being presented with coupons available for use against a particular purchase prevents the user from needing to locate an application coupon. Thus, the usability of the publication system is improved and the amount of network traffic related to searching e-mail archives is reduced.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
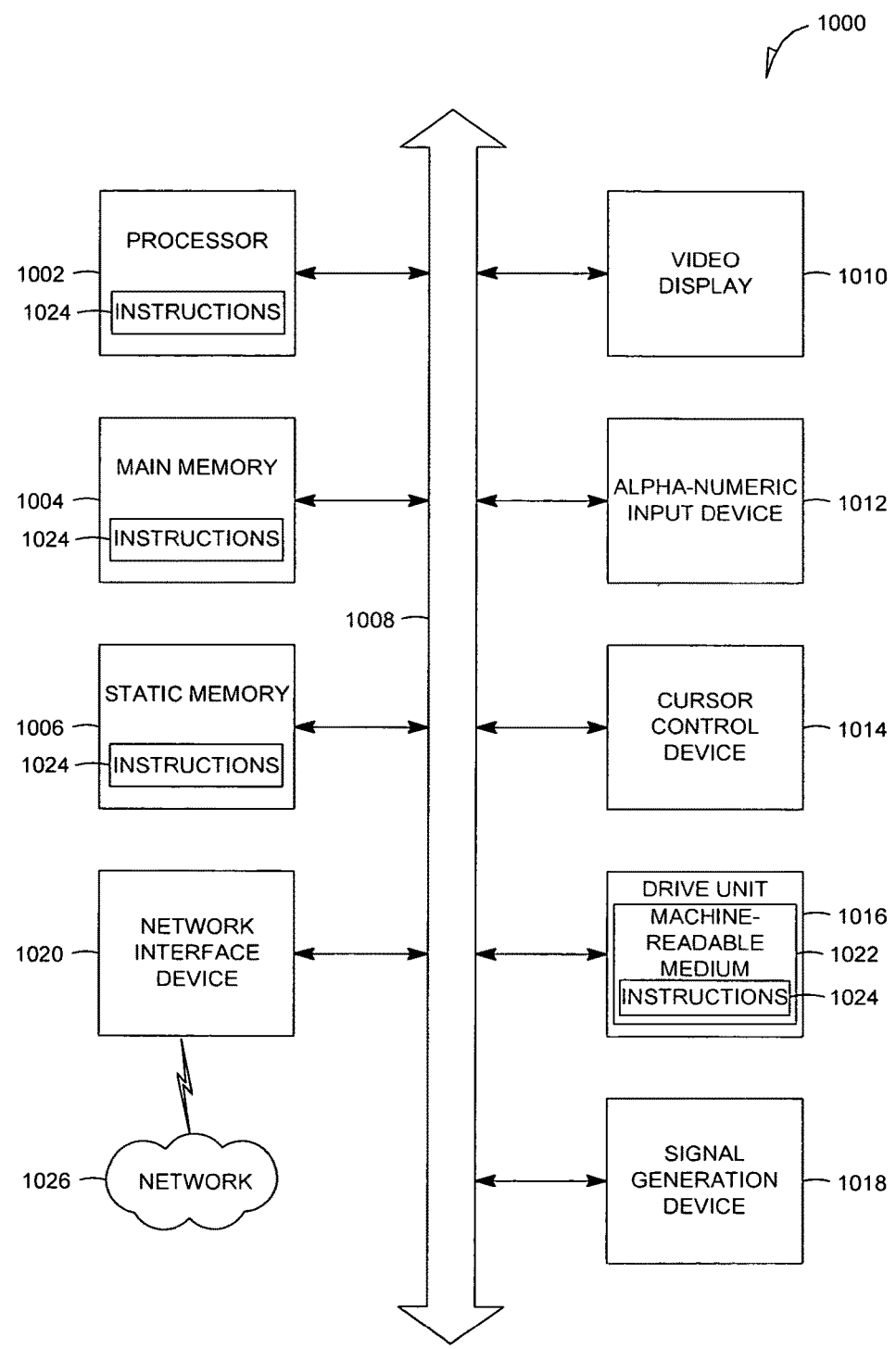
FIG. 10 is a diagrammatic representation of machine in the example form of a computer system within which a set of instructions for causing the machine to perform any one or more of the methodologies discussed herein, may be executed.

FIG. 10 is a block diagram of machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Data Structures

Figures 11A, 11B:
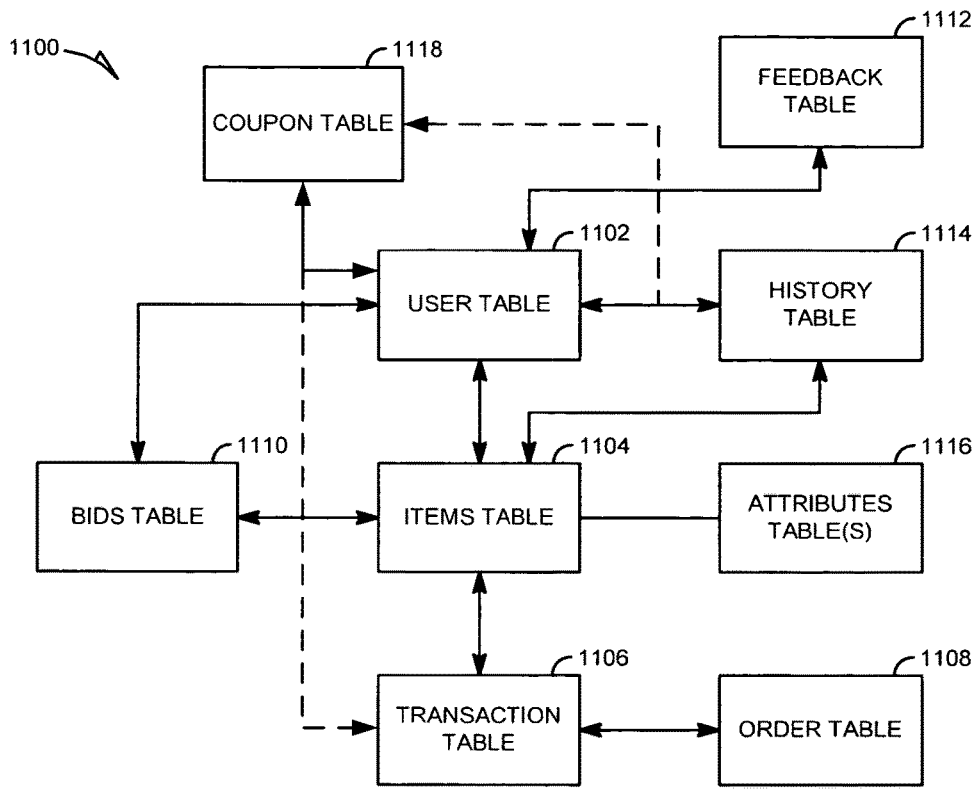
FIG. 11A is a high-level entity-relationship diagram, illustrating various tables.
FIG. 11B is a block diagram illustrating example fields in an example coupon table.

FIG. 11A is a high-level entity-relationship diagram, illustrating various tables 1100 that may be maintained within the databases 126, and that are utilized by and support the applications 120, 122, and 132. A user table 1102 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 1100 can also include an items table 1104 in which are maintained item records for goods and services that are available to be, or have been, transacted via the networked system 102. Each item record within the items table 1104 may furthermore be linked to one or more user records within the user table 1102, so as to associate a seller and one or more actual or potential buyers with each item record.

A transaction table 1106 contains a record for each transaction (e.g., a purchase or sale transaction) pertaining to items for which records exist within the items table 1104.

An order table 1108 is populated with order records, each order record being associated with an order. Each order, in turn, may be with respect to one or more transactions for which records exist within the transaction table 1106.

Bid records within a bids table 1110 each relate to a bid received at the networked system 102 in connection with an auction-format listing supported by an auction application 202. A feedback table 1112 is utilized by one or more reputation applications 208, in one example embodiment, to construct and maintain reputation information concerning users. A history table 1114 maintains a history of transactions to which a user has been a party. One or more attributes tables 1116 record attribute information pertaining to items for which records exist within the items table 1104. Considering only a single example of such an attribute, the attributes tables 1116 may indicate a currency attribute associated with a particular item, the currency attribute identifying the currency of a price for the relevant item as specified in by a seller.

A coupon table 1118 can be populated with coupon records, each coupon record being associated with a user. In this example, coupons are issued to an individual user. Each coupon may also be associated with a transaction in the transaction table 1106, provided the coupon has been redeemed by the user. A redeemed coupon may also has an associated record in the history table 1114.

FIG. 11B is a block diagram illustrating example fields in an example coupon table 1118. In an example, the coupon table 1118 can include fields including User ID 1120, External ID 1122, Program Code 1124, Incentive Type 1126, Value Type 1128, Application Type 1130, Coupon Type 1132, ISO Country Code 1134, Budget Amount 1136, Start Date 1138, Expiration Date 1140, Category ID 1142, Status 1144, Display Message 1146, Minimum Purchase Amount 1148, Maximum Discount Amount 1150, Discount Percentage 1152, and Maximum Usage Count 1154. In other examples, the coupon table 1118 could include additional fields, such as Transaction ID, linking the coupon to a completed transaction. The User ID 1120 can be a link into the User Table 1102. The External ID 1122 can used to identify the coupon in third party systems, for example. The Program Code 1124 can be used to identify the coupon campaign responsible for issuing the coupon. The Incentive Type 1126 can be used in an example to indicate who issued the coupon. In some examples, coupons can be issued by the network-based system 102, by individual seller's providing merchandise or services through the network-based system 102, or by product manufacturers. The coupon Type 1132 can be used to indicate whether the coupon is a fixed value coupon or a percent off coupon. The ISO Country Code 1134 can be used to indicate what countries the coupon is valid within. The Budget Amount 1136 can be used to indicate the total budget for the coupon campaign. In certain examples, a coupon is configurable to automatically expire once the budget amount assigned to the coupon campaign is reached. The Start Date 1138 can be used to indicate the earliest date on which the coupon can be redeemed. The Expiration Date 1140 can be used to indicate the last date on which the coupon can be redeemed. In certain example, a coupon can be associated with a particular product or service category within the network-based system 102. In these examples, the Category ID 1142 can be used to link the coupon to the valid category. The Status 1144 can be used to indicate whether the coupon is active, redeemed, or expired, for example. The Display Message 1146 can be used to provide a message to the user upon receiving or redeeming the coupon. The Minimum Purchase Amount 1148 can be used to indicate a minimum purchase necessary to redeem the coupon. The Maximum Discount Amount 1150 can be used to indicate the maximum dollar value (monetary value) of the coupon. For example, the coupon could be a 10% off coupon with a maximum discount amount of $50, which means that anything purchased over $500 would still only receive $50 off the purchase price. The Discount Percentage 1152 can be used to indicate the percent value of a percentage off type coupon. The Maximum Usage Count 1154 can be used to indicate how many times a coupon can be redeemed. For example, a single use coupon can have a maximum usage count 1154 of one.

The previous paragraph provides a description of an example embodiment of the coupon table 1118. The described embodiment can include additional or fewer fields depending upon the capabilities provided within a particular network-based system 102.

Thus, a method and system to dynamically issue coupons to a user on a network-based publication system have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of coordinating delivery of coupons issued by a network-based system, the method comprising:
    tracking, using one or more processors within the network-based system, user activities of a registered user that interacts with the network-based system;
    generating activity data based on the tracking of the user activities, wherein the activity data includes: a purchase history of the registered user within the network-based system, a browsing history of the registered user within the network-based system, and a frequency of use of the registered user of the network-based system;
    evaluating the activity data to determine that the registered user has met a predefined condition that is related to the purchase history, the browsing history, and the frequency of use of the registered user;
    issuing, using the one or more processors within the network-based system, a unique digital coupon redeemable exclusively by the registered user of the network-based system in response to determining that the registered user has met the predefined condition, wherein the unique digital coupon is issued based on the unique digital coupon being determined to be contextually relevant to a current interaction of the registered user with the network-based system;
    delivering, using the one or more processors, a first notification of the unique digital coupon issued to the registered user via a first communication channel internal to the network-based system; and
    delivering a second notification of the unique digital coupon issued to the registered user via a second communication channel external to the network-based system, in coordination with the first notification, and in response to the issuing the unique digital coupon, wherein delivering the second notification includes:
        identifying a remote computing system used by the registered user to access the network-based system;
        generating, in response to identifying the remote computing system, remote system identification information; and
        transmitting, to an external system operating an affiliated on-line search engine, the remote system identification information and coupon information describing the unique digital coupon for use in delivery of the second notification via the affiliated on-line search engine such that the external system is enabled to identify that the unique digital coupon is associated with the remote computing system to cause a displaying, at the remote computing system, of the unique digital coupon among a set of unique digital coupons in response to the remote computing system accessing the affiliated on-line search engine and in response to the remote computing system being associated with the unique digital coupon, wherein the set of unique digital coupons are issued to the registered user.

2. The method of claim 1, wherein the first communication channel includes a web-based interface of the network-based system.

3. The method of claim 1, wherein the first communication channel includes a messaging system of the network-based system.

4. The method of claim 1, further comprising applying the unique digital coupon to a purchase by the registered user on the network-based system.

5. The method of claim 1, wherein the delivering includes presenting the second notification of the unique digital coupon in conjunction with displaying a search request results listing.

6. The method of claim 1, wherein the delivering the first notification of the unique digital coupon via the first communication channel includes using at least one of:
    an account page associated with the registered user;
    a real-time message display;
    a checkout interface;
    a web page header;
    an item listing; or
    a customer service interface.

7. The method of claim 1, wherein the delivering the second notification of the unique digital coupon to the registered user via the second communication channel includes using at least one of:
    a web-based interface;
    an electronic message; or
    a telephone call.

8. A computer-implemented system for coordinating delivery of digital coupons issued by a network-based system, the computer-implemented system comprising a server including one or more processors coupled to a memory device, the one or more processors in coordination with the memory device causing the performance of operations comprising:

tracking user activities of a registered user within the network-based system;

generating activity data based on the tracking of the user activities, wherein the activity data includes information related to one or more activities selected from a group of activities consisting of: a purchase history of the registered user within the network-based system, a browsing history of the registered user within the network-based system, and a frequency of use of the registered user of the network-based system;

evaluating the activity data to determine that the registered user has met a predefined condition that is related to the one or more activities purchase history, the browsing history, and the frequency of use of the registered user;

issuing a unique digital coupon redeemable exclusively by the registered user of the network-based system in response to determining that the registered user has met the predefined condition;

delivering a first notification of the unique digital coupon issued to the registered user via a first communication channel internal to the network-based system in response to issuing the unique digital coupon; and delivering a second notification of the unique digital coupon issued to the registered user via a second communication channel external to the network-based system, in coordination with delivering the first notification, and in response to issuing the unique digital coupon, wherein delivering the second notification includes:

identifying a remote computing system used by the registered user to access the network-based system;

generating, in response to identifying the remote computing system, remote system identification information; and transmitting, to an external system operating an affiliated on-line property, the remote system identification information and coupon information describing the unique digital coupon for use by the affiliated on-line property in delivering the second notification via the second communication channel external to the network-based system such that the external system is enabled to identify that the unique digital coupon is associated with the remote computing system to cause a displaying, at the remote computing system, of the unique digital coupon among a set of unique digital coupons in response to the remote computing system accessing the affiliated on-line property and in response to the remote computing system being associated with the unique digital coupon, wherein the set of unique digital coupons are issued to the registered user.

9. The computer-implemented system of claim 8, wherein the operations further comprise applying the unique digital coupon to a purchase by the registered user.

10. The computer-implemented system of claim 8, wherein the affiliated on-line property is a search engine.

11. The computer-implemented system of claim 8, wherein the operations further comprise delivering the first notification of the unique digital coupon via the first communication channel using at least one of:

an account page associated with the registered user;

a real-time message display;

a check-out interface;

a web page header;

an item listing; or a customer service interface.

12. The computer-implemented system of claim 8, wherein the operations further comprise delivering notifications of multiple coupons issued to the registered user.

13. The computer-implemented system of claim 8, wherein the second communication channel includes at least one of:

an electronic message;

a web page; or a telephone call.

14. A non-transitory machine-readable storage medium embodying instructions which, in response to being executed by a computer-implemented network-based system, cause the computer-implemented network-based system to perform operations comprising:

tracking user activities of a registered user within the network-based system;

generating activity data based on the tracking of the user activities, wherein the activity data includes information related to one or more activities conducted by the user with respect to the network-based system;

evaluating the activity data to determine that the registered user has met a predefined condition that is related to the one or more activities;

issuing a unique digital coupon redeemable exclusively by the registered user of the network-based system in response to determining that the registered user has met the predefined condition;

delivering a first notification of the unique digital coupon issued to the registered user via a first communication channel internal to the network-based system; and delivering a second notification of the unique digital coupon issued to the registered user via a second communication channel external to the network-based system, in coordination with the first notification, and in response to the issuing the unique digital coupon, wherein delivering the second notification includes:

identifying a remote computing system used by the registered user to access the network-based system;

generating, in response to identifying the remote computing system, a remote system identification information; and transmitting, to an external system operating an affiliated on-line property, the remote system identification information and coupon information describing the unique digital coupon for use in delivery of the second notification via the affiliated on-line property such that the external system is enabled to identify that the unique digital coupon is associated with the remote computing system to cause a displaying, at the remote computing system, of the unique digital coupon among a set of unique digital coupons in response to the remote computing system accessing the affiliated on-line property and in response to the remote computing system being associated with the unique digital coupon, wherein the set of unique digital coupons are issued to the registered user.

15. The non-transitory machine-readable storage medium of claim 14, wherein the operations further comprise applying the unique digital coupon to a purchase by the registered user on the network-based system.

16. The non-transitory machine-readable storage medium of claim 14, wherein the affiliated on-line property is a search engine.

17. The non-transitory machine-readable storage medium of claim 14, wherein the delivering the first notification of the unique digital coupon via the first communication channel includes using at least one of:
an account page associated with the registered user;
a real-time message display;
a checkout interface;
a web page header;
an item listing; or
a customer service interface.

18. The non-transitory machine-readable storage medium of claim 14, wherein the delivering the first notification of the unique digital coupon via the first communication channel includes displaying all coupons issued to the registered user.

19. The non-transitory machine-readable storage medium of claim 14, wherein the delivering the second notification of the unique digital coupon to the registered user via the second communication channel includes using at least one of:
an electronic message;
a web page; or
a telephone call.

20. The non-transitory machine-readable storage medium of claim 14, wherein the one or more activities are selected from a group of activities consisting of: a purchase history of the registered user within the network-based system, a browsing history of the registered user within the network-based system, and a frequency of use of the registered user of the network-based system.

21. The non-transitory machine-readable storage medium of claim 14, wherein the unique digital coupon is issued based on the unique digital coupon being determined to be relevant to a current interaction of the registered user with the network-based system.

* * * * *